(12) United States Patent
Wieczorek et al.

(10) Patent No.: US 9,753,152 B2
(45) Date of Patent: Sep. 5, 2017

(54) SEMICONDUCTOR SCINTILLATION DETECTOR

(71) Applicant: KONINKLIJKE PHILIPS N.V., Eindhoven (NL)

(72) Inventors: Herfried Karl Wieczorek, Aachen (DE); Cornelis Reinder Ronda, Aachen (DE); Lars Reine Wallenberg, Lund (SE); Maria Elise Messing, Malmö (SE); Staffan Hansen, Lund (SE); Bjoern John Andres Oehrstrand, Lund (SE); Anna Helmi Caroline Lindberg, Lund (SE); Niklas Goesta Ehrlin, Lund (SE); Robert Tommy Hallberg, Lund (SE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/899,566

(22) PCT Filed: Jun. 26, 2014

(86) PCT No.: PCT/EP2014/063595
§ 371 (c)(1),
(2) Date: Dec. 18, 2015

(87) PCT Pub. No.: WO2014/207144
PCT Pub. Date: Dec. 31, 2014

(65) Prior Publication Data
US 2016/0131769 A1    May 12, 2016

(30) Foreign Application Priority Data
Jun. 28, 2013 (EP) .................... 13174240

(51) Int. Cl.
G01T 1/24 (2006.01)
G01T 1/20 (2006.01)
G01T 1/29 (2006.01)

(52) U.S. Cl.
CPC .............. *G01T 1/2018* (2013.01); *G01T 1/24* (2013.01); *G01T 1/241* (2013.01); *G01T 1/249* (2013.01); *G01T 1/2985* (2013.01)

(58) Field of Classification Search
None
See application file for complete search history.

(56) References Cited

U.S. PATENT DOCUMENTS 6,175,120 B1    1/2001    McGregor et al.
7,612,342 B1    11/2009   Nagarkar
(Continued)

FOREIGN PATENT DOCUMENTS

WO    WO2010/073189    *   7/2010    ........... H01L 27/146

OTHER PUBLICATIONS

Steinberger and Asaf, "Band-Structure Parameters of Solid and Liquid Xenon" Physical Review B, vol. 8, No. 2, 915-18 (1973).*
(Continued)

*Primary Examiner* — Edwin Gunberg

(57) ABSTRACT

A radiation detection device detects gamma or x-ray radiation quanta with improved timing accuracy and improved energy resolution. The radiation detection device finds application in the detection of gamma and x-ray radiation and may be used in the field of PET imaging, and in spectral CT. The radiation detection device includes a semiconductor scintillator element and a photodetector. The photodetector is in optical communication with the scintillator element. The scintillator element has two mutually opposing faces; a (Continued)

cathode is in electrical communication with one of the two faces and an anode is in electrical communication with the other of the two faces.

17 Claims, 7 Drawing Sheets

(56) References Cited

U.S. PATENT DOCUMENTS

2013/0032706 A1    2/2013   Cho
2013/0032720 A1    2/2013   Lee et al.

OTHER PUBLICATIONS

Amaudruz P et al: "Simultaneous reconstruction of scintillation light and ionization charge produced by 511keV photons in liquid xenon: Potential application to PET", Nuclear Instruments & Methods in Physics Research. Section A: Accelerators, Spectrometers, Detectors, and Associated Equipment, Elsevier BV North-Holland, NL, vol. 607, No. 3, Aug. 21, 2009.
Nuclear Instruments and Methods in Physics Research A 486 (2002) pp. 214-219, Derenzo, S.E. et al.
"Scintillation properties of ceramics based on zinc oxide", Radiation Measurements vol. 42, issues 4-5, Apr.-May 2007, pp. 549-552, Demidenko, V, et al.
H. Barrett et al., Phys. Rev. Lett. 75, 156 (1995).
D.S. McGregor et al., IEEE Trans. Nucl. Sci. vol. 45, p. 443-449 (1998).

* cited by examiner

SEMICONDUCTOR SCINTILLATION DETECTOR

CROSS REFERENCE TO RELATED APPLICATIONS

This application is a national filing of PCT application Serial No. PCT/EP2014/063595, filed Jun. 26, 2014, published as WO 2014/207144 on Dec. 31, 2014, which claims the benefit of European Patent Application Number 13174240.5 filed Jun. 28, 2013, which is incorporated herein by reference.

FIELD OF THE INVENTION

The invention relates to a device for the detection of gamma or x-ray radiation quanta. A system and a computer readable medium for use in accordance with the device are further disclosed. The invention finds particular application in the detection of radiation quanta in the fields of nuclear and x-ray imaging. More particularly the invention finds application in PET imaging systems and in spectral CT imaging systems.

BACKGROUND OF THE INVENTION

Detectors of ionizing radiation such as gamma and x-ray radiation quanta that are used in for example PET or x-ray imaging systems conventionally include a scintillator element and a photodetector. The scintillator element receives the radiation quanta, and converts each radiation quantum into a pulse of infrared, visible or ultraviolet light that is detected by the photodetector. The resulting electrical pulse from the photodetector is subsequently analyzed to determine characteristics of the radiation quantum.

In a PET imaging system the time of reception and the energy of each radiation quantum are used respectively to determine and validate the origin of radioactive decay events. Gamma photons that are received within a narrow predetermined time interval of each other by detectors disposed around a PET imaging region are indicative of their generation at a common origin, and gamma photons having energies within a predetermined narrow range are indicative of the absence of path-altering scattering between their points of origin and detection. In a PET imaging system the time of reception of a gamma photon is determined by a timestamping unit which records the time at which the photodetector's electrical signal exceeds a predetermined threshold. A coincidence determination unit subsequently identifies pairs of timestamps that occur within a narrow time interval, typically within +/−5 ns of each other, as coincident events. The energy of each gamma photon is determined by integrating the photodetector's electrical signal; thus by summing the energy from the individual optical photons produced in the scintillator element by the gamma photon.

The advantage of such a scintillator-based detector in which a photodetector generates the timing signal is its fast response. Currently-used scintillator materials such as LYSO $(Lu,Y)_2SiO_5$:Ce and GAGG $Gd_3(Al,Ga)_5O_{12}$:Ce are capable of generating a timestamp with an accuracy of approximately a few hundred picoseconds, making them suitable for use in PET imaging applications. The fast decay times of LYSO and GAGG of approximately 45 ns and 90 ns respectively contribute to this timing accuracy by ensuring that the scintillation light decays to a negligible level between consecutively-received gamma photons. However, the energy discrimination of such scintillator-based detectors is hampered by the relatively low light yield of scintillator materials. LYSO has a light yield of approximately 32000 photons/MeV, and GAGG has a light yield of approximately 65000 photons/MeV. At these light yields the photon statistics limit the energy resolution to values of 10-12% for 511 keV gamma photons.

Electrical signals from a photodetector in a scintillation-based x-ray detector are generated in an analogous way. Scintillator materials such as $Gd_2O_2S$ doped with Pr (GOS) and $(Y,Gd)_2O_3$ doped with Eu that are typically used in x-ray CT are however too slow to provide timing information for individual x-ray quanta at the radiation flux densities used in CT imaging. Consequently when these materials are used in CT the photodetector's electrical signal is integrated in order to determine the received x-ray flux density. When spectral CT is implemented with such materials, energy discrimination is provided either by kV switching in which the radiation source is temporally switched to generate x-ray radiation quanta at different energies, or by generating x-ray radiation quanta with different energies simultaneously and using a stacked detector to discriminate the energy of each radiation quanta based on its absorption depth in the detector.

Photon-counting x-ray detectors have also been used in the field of spectral CT in which materials such as CZT ((Cd,Zn)Te) directly convert the energy of a received x-ray radiation quantum to a charge signal. When the charge signal exceeds a threshold it triggers a counter that records the total number of radiation quanta traversing a particular line in space. Such a configuration may be used to determine the attenuation of matter between an x-ray source and detector. Furthermore, the amplitude of each individual electrical signal is indicative of the energy of the quantum, permitting energy discrimination of the received quanta. By comparing the counts at different quantum energies for a particular line in space, further properties of the intervening matter may be determined. Such direct-detection x-ray detectors however have inherently poor timing accuracy. The drift time of the charge cloud generated in response to a received x-ray quantum takes some 100 ns to reach the detector's contacts where it is detected. However, in x-ray detection the absolute time of the reception of each radiation quantum is of minor importance, so inherent variations in the time taken for the charge cloud to drift to the detector's contacts have little significance. Such a direct-detection technique capable of counting and discriminating based on quantum's energy therefore finds application in spectral CT imaging. By contrast, in PET imaging such variability in the timing signal would be unacceptable, restricting the application of this technique to x-ray detection.

A document "*Investigation of liquid xenon detectors for PET: Simultaneous reconstruction of light and charge signals from 511 keV photons*" by P. Amaudruz et al., *Nuclear Science Symposium Conference Record*, 2007. NSS 07. IEEE, vol 4, pp. 2889-2891 discusses another scintillation-based gamma photon detector in which liquid xenon is used as the scintillator element. A photodiode coupled to the container of the liquid xenon detects the optical signal generated in response to a received gamma photon, and electrodes disposed on the surfaces of the container are electrically biased so as to separate ionization charge carriers that are generated by the gamma photon. Wires that are disposed in the liquid xenon measure the current induced by electrons as they drift between the electrodes in a configuration known as a time projection chamber. An energy resolution of less than 4% was achieved by combining scintillation light an ionization charge.

However, the drawbacks of using liquid xenon in such scintillation-based detectors are several, including the need for cooling or high pressure containment. Furthermore, with a density of 2.978 g/cm$^3$ at the triple point temperature of 161.4 K, in order to capture the same proportion of incident gamma photons, liquid xenon requires a thicker scintillator element than traditional scintillator materials such as LYSO which has a density of 7.3 g/cm$^3$. The safety issues associated with use of large volumes of cooled and or high pressure liquid xenon further complicate the practicality of its use in for example a PET imaging system.

Consequently a need remains for gamma photon and x-ray detectors in which good timing accuracy and good energy resolution may be obtained in the absence of the drawbacks of such practical and safety issues.

SUMMARY OF THE INVENTION

It is an object of the invention to provide a radiation detection device for detecting gamma or x-ray radiation quanta having good timing accuracy. It is a further object of the invention to provide such having good energy resolution.

These objects are achieved by a radiation detection device comprising a semiconductor scintillator element and a photodetector. The photodetector is in optical communication with the scintillator element. The scintillator element has two mutually opposing faces; a cathode is in electrical communication with one of the two faces and an anode is in electrical communication with the other of the two faces.

In use, the reception of a gamma photon by the semiconductor scintillator element results in the generation of a charge cloud and an optical pulse. The charge cloud is separated into its constituent electrons and holes by a bias voltage that is applied between the anode and the cathode. Consequently the electrons and holes migrate toward the anode and cathode respectively. The magnitude of charge collected at the anode or at the cathode is indicative of the gamma photon energy. High energy resolution is achieved by forming the scintillator element from a semiconductor because semiconductors generate a high number of electron-hole pairs in response to the reception of a gamma photon. The high number of electron-hole pairs results in a high signal to noise ratio energy signal. The corresponding optical pulse generated in the scintillator element is generated through luminescence, more particularly fluorescence and is thus generated quickly. Its detection by the photodetector results in an electrical signal that may be used to accurately determine the time of reception of the gamma photon. Consequently the time of detection of the radiation quantum may be determined from the radiation detection device.

Semiconductors are conventionally considered to be poor emitters of scintillation light. Consequently the use of a semiconductor scintillator may be considered inadequate for producing an optical pulse to accurately time the detection of a radiation quantum. However the inventors have realized that since only a few optical photons need be detected in order to generate the timing signal that corresponds to the charge cloud, the use of a semiconductor scintillator element is indeed adequate.

Suitable semiconductor materials for the scintillator element include both crystalline and amorphous or polycrystalline or ceramic materials. Cadmium zinc telluride (CZT), HgI$_2$ and PbI$_2$ are suitable crystalline materials. Typically the luminescence may be improved by cooling to below room temperature.

In accordance with one aspect of the invention the scintillator element has an amorphous structure or a polycrystalline or a ceramic structure. Amorphous, polycrystalline or ceramic semiconductor scintillator materials including CuI, HgI$_2$, PbI$_2$, ZnO:Ga and CdS: In reported in document *Nuclear Instruments and Methods in Physics Research A* 486 (2002) pp 214-219, Derenzo, S. E et al, generate the necessary combination of luminescence, more particularly fluorescence emission and an electrical charge cloud in response to the reception of radiation quanta. ZnO is also suitable. These materials generate the desired optical pulse at room temperature, however, in general the light yield is improved by cooling them to below room temperature. For example, in the case of ZnO:Ga the light yield may be improved by a factor of 33 by cooling the semiconductor from 365 K to 12 K. In spite of the low light yield at room temperature, a sufficient number of optical photons can be obtained to yield the desired timestamp because the decay time of these semiconductors is so short, typically less than 1 nanosecond.

For the semiconductor scintillator material ZnO:Ga a room temperature light yield of 9000 ph/MeV has been reported in document *"Scintillation properties of ceramics based on zinc oxide", Radiation Measurements* Volume 42, Issues 4-5, April-May 2007, Pages 549-552, Demidenko, V, et al. This compound has a high density of 5.6 g/cm$^3$ which assists in minimizing the thickness of scintillator material that is necessary to absorb radiation quanta. Indium Tin Oxide (ITO) with a reported density of 7.1-7.2 g/cm$^3$ is another suitable semiconductor scintillator material and its higher density further assists in reducing the thickness of scintillator element. Furthermore, owing to its bandgap of approximately 4 eV, ITO has high optical transparency which improves the proportion of scintillation light collected by the photodetector.

Other suitable amorphous, polycrystalline or ceramic semiconductor scintillator materials include bismuth vanadate Bi$_2$VO$_{5.5}$, BiVO$_4$, Bi$_2$O$_3$ or composites thereof, bismuth telluride (Bi$_2$Te$_3$), antimony tellurides, or tungsten oxide.

The above semiconductor scintillator materials that have been described in relation to their use as the scintillator element will be recognized as inorganic semiconductor scintillator materials.

Advantageously the use of amorphous, polycrystalline or ceramic semiconductor materials for the scintillator element simplifies its fabrication process as compared the use of crystalline semiconductor materials. Furthermore such fabrication processes are more suited to the fabrication of scintillator elements with complex shapes. Furthermore the reduction in rare earth material content in the scintillator element as compared to traditional materials such as LYSO reduces the dependency on limited natural resources of these materials.

In accordance with one disclosed apparatus there is a radiation detection device (20, 30, 40, 50, 60, 70, 80) for detecting gamma or x-ray radiation quanta comprising: a semiconductor scintillator element (21) having two mutually opposing faces (23, 24); at least one photodetector (22); at least one cathode (25) in electrical communication with at least a portion of one of the two scintillator element faces; at least one anode (26) in electrical communication with at least a portion of the other of the two scintillator element faces; wherein the at least one photodetector (22) is in optical communication with the scintillator element (21).

In accordance with another aspect of the invention the radiation detection device further includes a shielding electrode. The shielding electrode is a conductive layer that is embedded within the scintillator element between the anode and the cathode and electrically isolated from the scintillator element. The electrically-isolated conductive layer has a plurality of perforations that are sized and oriented to permit the passage of electrons along a path from the region between the conductive layer and the cathode to the region between the conductive layer and the anode. The shielding electrode acts to improve the energy resolution of the radiation detection device.

In accordance with another aspect of the invention the radiation detection device further includes a plurality of inductive sensing electrodes that are embedded within the scintillator element in the region between the anode and the cathode. The inductive sensing electrodes advantageously provide a means for determining the lateral incidence position of a radiation quantum with respect to the scintillator element.

In accordance with another aspect of the invention one face of the scintillator element has a plurality of laterally-separated anodes. The anodes are in electrical communication with the scintillator element. By collecting charge carriers from the charge cloud at the separate anodes the lateral incidence position of a radiation quantum with respect to the scintillator element may be determined.

In accordance with another aspect of the invention one face of the scintillator element has a plurality of laterally-separated anodes that are in electrical communication with the scintillator element, and a common steering electrode is also disposed on the same face of the scintillator element. In use, a bias potential applied to the common steering electrode steers migrating charge carriers toward the individual laterally-separated anodes. Advantageously the improved charge carrier segregation provided by the common steering electrode improves the accuracy of determining the lateral incidence position of a radiation quantum with respect to the scintillator element.

In accordance with another aspect of the invention the radiation detection device has a single anode and further includes a common steering electrode that is disposed on the same face of the scintillator element as the anode. The common steering electrode surrounds the anode such that there is a gap between the anode and the common steering electrode. Advantageously the common steering electrode reduces leakage currents in the vicinity of the anode, thereby improving the accuracy of determining the lateral incidence position of a radiation quantum with respect to the scintillator element.

In accordance with another aspect of the invention the radiation detection device has a plurality of laterally-separated anodes in electrical communication with one of the two scintillator element faces and a plurality of laterally-separated cathodes in electrical communication with the other of the two scintillator element faces. The electrode configuration advantageously permits the determination of a radiation quantum's lateral position of interaction with the scintillator element.

In accordance with another aspect of the invention the radiation detection device further includes a shielding electrode which is implemented as a conductive region that is disposed on a side face of the scintillator element. The side face is disposed between the two mutually opposing faces. The side face may lie in a plane that is transversely orientated with respect to either or both of the mutually opposing faces. The shielding electrode is disposed between the cathode and the anode and is dielectrically isolated from the side face of the scintillator element. Advantageously the shielding electrode acts to improve the energy resolution of the radiation detection device.

In accordance with another aspect of the invention at least one anode or at least one cathode in the radiation detection device is formed from a transparent conductive layer. Furthermore a photodetector is in optical communication with the scintillator element by means of an optical interface that includes at least a portion of the transparent conductive layer. Such a configuration may be used to improve the light collection efficiency of the scintillation light. By improving the light collection efficiency the timing accuracy of the radiation detection device is improved. The improved timing accuracy may be advantageously used in a PET imaging system to improve image quality through a more accurate determination of gamma photon coincidence.

In accordance with another aspect of the invention the radiation detection device has a plurality of laterally-separated anodes. The device further includes electronic circuitry configured for each anode to convert electrical charge collected at that anode into an electrical current or voltage signal; and electronic circuitry or a processor configured to receive the electrical current or voltage signals and to compute the lateral position of interaction of a radiation quantum received by the scintillator element based on the relative magnitudes of the electrical current or voltage signals. Suitable electronic circuitry for conversion of the electric charge includes for example charge amplifiers, current amplifiers, or a transimpedance amplifier. Advantageously the spatial resolution of the radiation detection device is improved through the ability to compute the lateral position of interaction of a radiation quantum received by the scintillator element. Such a configuration may advantageously be used in a PET imaging system to improve image quality.

In accordance with another aspect of the invention the radiation detection device further includes electronic circuitry configured for each anode to convert electrical charge collected at that anode into an electrical current or voltage signal; and electronic circuitry or a processor configured to receive the one or more electrical current or voltage signals and to compute the energy of a gamma or x-ray radiation quantum received by the scintillator element by summing the magnitudes of the one or more electrical current or voltage signals to generate a summed signal indicative of the total charge collected at the one or more anodes. Advantageously the energy resolution of a radiation detection device is improved through the ability to compute the energy of a gamma or x-ray radiation quantum received by the scintillator element. Such a configuration may advantageously be used in a PET imaging system to improve image quality through improved validation of coincident events by comparing the energies of received gamma photons with an expected energy.

In accordance with another aspect of the invention the radiation detection device further includes first timing circuitry configured to receive electrical signals generated by each of the at least one photodetector in response to the reception of a gamma or x-ray radiation quantum and to generate a first timestamp indicative of the earliest time at which an electrical signal generated by any of the at least one photodetector exceeds a first predetermined threshold. The radiation detection device further includes electronic circuitry configured for each anode to convert electrical charge collected at that anode into an electrical current or voltage signal; and second timing circuitry configured to receive the electrical current or voltage signals generated from electrical charge collected by each anode in response to the reception of the gamma or x-ray radiation quantum and to generate a second timestamp indicative of the time at which at least one of the electrical current or voltage signals exceed a second predetermined threshold. The device further includes electronic circuitry or a processor configured to compute the depth of interaction of the radiation quantum in the scintillator element based on the time difference between the first timestamp and the second timestamp. The depth of interaction may be computed using the product of the time difference and the speed of light in the scintillator. The computation may further compensate for the geometric path of the radiation quantum in the scintillator element based on its trajectory which may be computed using its spatial position of interaction with the scintillator element. Advantageously the depth of interaction may be used to improve the determination of the trajectory of a radiation quantum received by the radiation detection device. Such information may be combined with information on the lateral position of interaction of a radiation quantum in the scintillator element in a PET imaging system to improve image quality through the rejection of time-wise coincident pairs of events that have in practice undergone scattering.

In accordance with another aspect of the invention a PET or x-ray imaging system comprises a radiation detection device in accordance with one or more of the previously described aspects of the invention.

In accordance with another aspect of the invention a computer readable medium is disclosed. The computer readable medium carries instructions which when executed on a processor cause the processor to either i) generate a timestamp indicative of the time of reception of a gamma or x-ray radiation quantum by the radiation detection device by executing the method steps of: receiving electrical signals generated by the at least one photodetector in response to reception of a gamma or x-ray radiation quantum by the scintillator element; and assigning a timestamp to the earliest electrical signal to exceed a predetermined threshold; or to ii) determine the energy of a gamma or x-ray radiation quantum received by the radiation detection device by executing the method steps of: receiving electrical signals generated by electrical charge collected at each of the at least one anode; and summing the magnitudes of the electrical signals to generate a summed signal indicative of the total charge collected at the one or more anodes. The computer readable medium may advantageously be used in conjunction with the radiation detection device to improve the timing accuracy and/or the energy resolution of the radiation detection device.

DETAILED DESCRIPTION OF THE INVENTION

In order to provide a radiation detection device for detecting gamma or x-ray radiation quanta having good timing accuracy and good energy resolution, the present invention comprising a semiconductor scintillator element and a photodetector is described in relation to a PET imaging system. However, it is to be further appreciated that the invention also finds application in x-ray imaging systems, in particular in spectral CT imaging systems.

Figure 1:
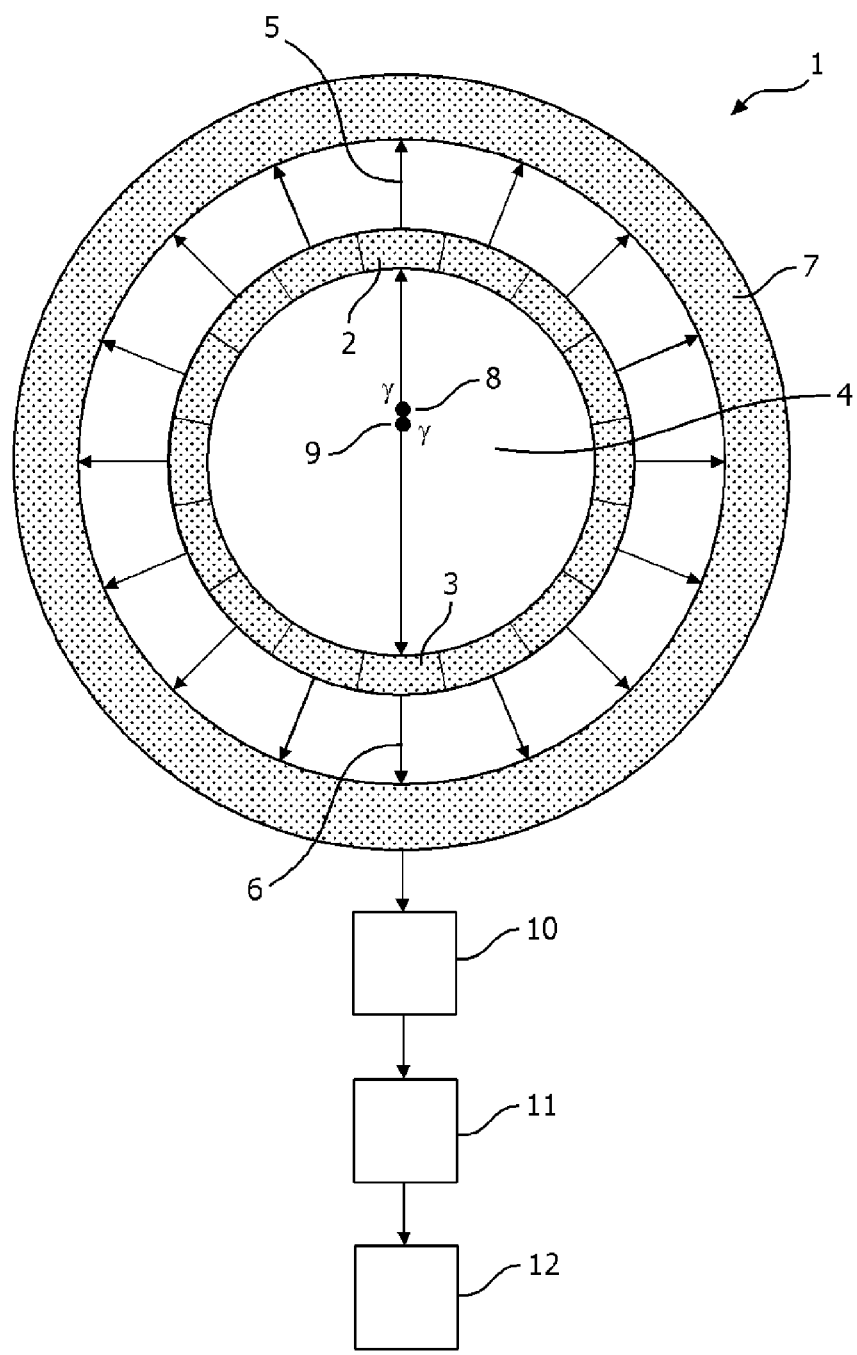
FIG. 1 illustrates an exemplary PET imaging system in accordance with certain aspects of the invention.

FIG. 1 illustrates an exemplary PET imaging system in accordance with certain aspects of the invention. The radiation detection device of the present invention may for example be used in the system illustrated in FIG. 1. In FIG. 1, PET imaging system 1 comprises a plurality of gamma radiation detection devices 2, 3 disposed radially about imaging region 4 in order to receive gamma radiation, otherwise known as gamma photons, from imaging region 4. The plurality of gamma radiation detection devices each produce electrical signals indicative of the reception of gamma photons, and the electrical signals are received by coincidence determination unit 7 by means of bus 5, 6. The gamma photons may be a pair of oppositely-directed gamma photons 8, 9 formed as a consequence of an annihilation event following radioactive decay wherein the radioactive decay produces a positron that is annihilated by an electron. Coincidence determination unit 7 assesses the time of reception of each of the gamma photons represented by the electrical signals and sorts the gamma photons into pairs of coincident events received within a narrow time interval of each other. The time interval is typically +/−5 ns in PET. Coincidence determination unit 7 may further analyze the energy associated with each received gamma photon and deem pairs of gamma photons as coincident if they both occur within a narrow time interval as well as have energies within a narrow predetermined energy window, typically within +/−10% of the peak gamma photon energy. Coincidence determination unit 7 is in communication with reconstruction processor 10 which constructs a line of response for each pair of received gamma photons deemed coincident and further processes multiple such lines of response in order to reconstruct data representative of an image of the originating positions of the received gamma photons deemed coincident by coincidence determination unit 7. Reconstruction processor 10 may use techniques such as iterative reconstruction and filtered backprojection. Reconstruction processor 10 is in further communication with image processing unit 11 which is configured to process the data representing the originating positions of the coincident gamma photons into a format suitable for presenting an image on an output device. Image processing unit 11 is in further communication with an output device 12 for presenting the image, such as a display, a printer and the like.

The radiation detection device of the present invention finds exemplary application as a gamma radiation detection device 2, 3 in FIG. 1 from which it is desirable to determine the time of reception of each gamma photon and its energy. These parameters may, as described above, be used by coincidence determination unit 7 in determining and validating the coincidence of pairs of gamma photons 8, 9 received from imaging region 4.

Figure 2:
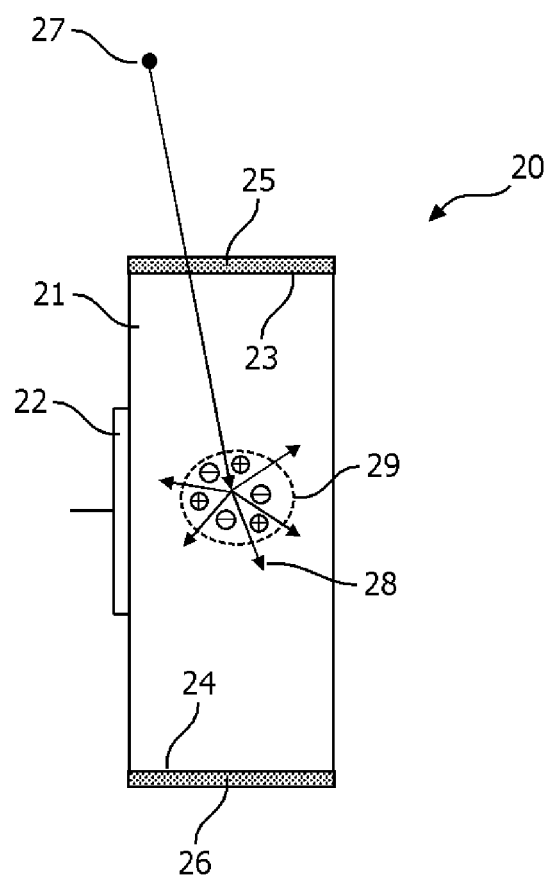
FIG. 2 illustrates an exemplary radiation detection device in accordance with certain aspects of the invention.

FIG. 2 illustrates an exemplary radiation detection device in accordance with certain aspects of the invention. In FIG. 2, radiation detection device 20 comprises semiconductor scintillator element 21 in optical communication with photodetector 22. Semiconductor scintillator element 21 has two mutually opposing faces 23, 24. A cathode 25 is in electrical communication with one of the two scintillator element faces 23, and an anode 26 in electrical communication with the other of the two scintillator element faces 24.

With reference to FIG. 2; in operation, the reception of radiation quantum 27, such as a gamma photon, by semiconductor scintillator element 21 results in the generation of a pulse of scintillation light 28 comprising a plurality of optical photons having wavelengths within a characteristic optical emission spectrum of semiconductor scintillator element 21. Decay times for the optical pulse of less than 400 ns, less than 200 ns, less than 100 ns or more preferably less than 50 ns are particularly advantageous. Simultaneously with pulse of scintillation light 28, radiation quantum 27 causes the generation of charge cloud 29, comprising a plurality of electron-hole pairs. By correlating the detection of the optical pulse with the subsequent detection of charge carriers from the electrical charge cloud, the time of reception of the radiation quantum and its energy may be determined. Typically the energies of the optical photons are much smaller than that of the received radiation quantum 27 and thus the scintillation light may comprise wavelengths from the UV through the visible to the infrared spectral region. In typical scintillator materials the peak of the characteristic optical emission spectrum of semiconductor scintillator element 21 is in the visible wavelength region. In use, a potential difference applied between anode 26 and cathode 25 separates the charge cloud into its constituent electrons and holes, causing them to migrate toward anode 26 and cathode 25 respectively. By measuring the quantity of charge collected at the anode 26 or at the cathode 25 a signal indicative of the energy of radiation quantum 27 can be obtained. In a preferred configuration the electron charge is measured at the anode since in most semiconductor materials electrons have a higher mobility than holes and consequently faster detection of the radiation quantum's energy is achieved. Furthermore, electrons in semiconductor materials are in general less susceptible to the effect of trapping at defects; a phenomenon which reduces the quantity of charge collected by the respective electrode and consequently a higher signal to noise ratio charge signal can be measured at the anode as compared to the cathode. Preferably the charge is measured by detecting the current received at anode 26. A charge amplifier, a current amplifier or a transimpedance amplifier are example electronic circuits suitable for this purpose.

With reference to FIG. 2, the potential difference to be applied between anode 26 and cathode 25 is preferably determined in accordance with an electric field that causes the charge carriers to drift to their respective electrodes. A low potential difference causes charge carriers to migrate slowly through the process of drift, whereas higher potential differences cause the carriers move more quickly. At very high potential differences carriers may undergo impact ionization wherein an avalanche current is generated following charge carrier collisions with the scintillator atoms. Preferably the potential difference is below the threshold for impact ionization. Suitable electric field strengths are in the range 100 V/mm to 1000 V/mm, and more preferably in the range 200-300 V/mm.

With reference to FIG. 2, scintillator element 21 preferably has the shape of a square prism, although other prism forms such as a hexagonal prism are also suitable. A cylindrical scintillator element may also be used. Consequently the scintillator element may have additional surfaces or faces than the two mutually opposing faces 23, 24. Scintillator element 21 is illustrated as having a high aspect ratio a shown by the rectangular side view in FIG. 2. This is useful in presenting a long absorption depth to energetic radiation quanta in combination with good spatial resolution; however scintillator elements with different aspect ratios may alternatively be used. It is noted in particular that in the detection of lower energy radiation quanta such as x-ray radiation a lower aspect ratio may be used. Preferably opposing faces 23, 24 are mutually parallel, wherein parallel is to be understood to encompass arrangements within +/−10 degrees of exactly parallel.

With reference to FIG. 2, a single photodetector 22 is shown in optical communication with scintillator element 22, although it is to be appreciated that a plurality of photodetectors may also be used. One or more photodetectors may be in optical communication with a portion of any of the faces or surfaces of scintillator element 21. By configuring a plurality of photodetectors to detect scintillation light from a greater surface area of scintillator element 21, the probability of capturing a scintillation light pulse is increased, particularly if scintillation element 21 generates only a few optical photons in response to the reception of radiation quantum 27. In one example implementation photodetector 22 may be a solid state semiconductor photodetector, which is defined herein as a photodetector produced using monolithic processes in semiconductor materials. In another example implementation photodetector 22 may be a photodiode such as an avalanche photodiode (APD), a silicon photomultiplier (SiPM), or a single optical photon avalanche detector (SPAD); and in another example the photodetector may be a photomultiplier tube (PMT). The use of a solid state detector such as a photodiode improves compactness. A PMT detector has a fast response time and high sensitivity which makes it suitable for the detecting scintillation light resulting from radiation events with high sensitivity.

With reference to FIG. 2, a single anode 26 and a single cathode 25 are illustrated. However it is to be appreciated that alternatively a plurality of anodes may be in electrical communication with scintillator element face 24, and likewise a plurality of cathodes may be in electrical communication with scintillator element face 25.

Suitable scintillator elements for scintillator element 21 in FIG. 2 include both crystalline and less ordered structure semiconductor scintillator elements. Preferably the scintillator element exhibits luminescence at room temperature although scintillator elements that exhibit luminescence when cooled to below room temperature are also suitable. As described above, suitable materials include CZT CuI, $HgI_2$, $PbI_2$, ZnO and CdS:In, ZnO:Ga, ITO, bismuth vanadate $Bi_2VO_{5.5}$, $BiVO_4$, $Bi_2O_3$ or composites thereof, bismuth telluride ($Bi_2Te_3$), antimony tellurides, or tungsten oxide, luminescent materials showing significant quenching due to photoionization but without limitation to these examples. The use of semiconductor scintillator elements having a less ordered, thus an amorphous structure or a polycrystalline structure or a ceramic structure, has the advantage that electrodes may be embedded within the scintillator element during manufacture whilst maintaining the bulk electrical properties of the scintillator. Scintillator element 21 may be prepared in an amorphous, polycrystalline or ceramic form with electrodes already embedded the powdered constituents prior to its pressing into the so-called green body. The electrodes remain embedded within the scintillator element following firing of the ceramic during which the ceramic, polycrystalline or amorphous structure forms around them. Such embedding is not possible with a crystalline semiconductor scintillator element in which the necessary maintenance of the crystalline structure along the axis of its growth forbids such interruptions.

Figure 3:
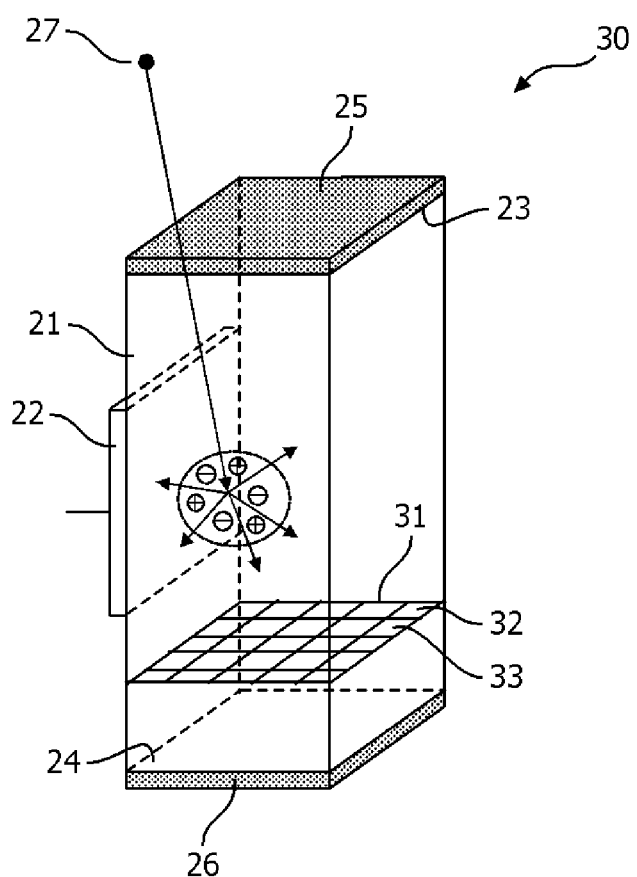
FIG. 3 illustrates an embodiment of a radiation detection device in which a shielding electrode is embedded within a scintillator element.

FIG. 3 illustrates an embodiment of a radiation detection device in which a shielding electrode is embedded within a scintillator element. The embedding of shielding electrode 31 in this way is enabled through the use of a scintillator element 21 having an amorphous or a polycrystalline or a ceramic structure. With reference to the radiation detection device of FIG. 2, a drawback of the solution of FIG. 2 is that the reception of a radiation quantum by scintillator element 21 results in a dependence of the total charge collected at each electrode upon the depth of interaction of radiation quantum 27 in the scintillator element. This is in part due to the premature recombination of charge carriers, typically holes, before they reach cathode 25. The electron charge sensed at anode 26 by means of a current flowing from anode 26 is affected by the hole charge collected at cathode 25. Since holes are typically highly susceptible to trapping, a radiation quantum absorbed deep in scintillator element 21 results in a higher proportion of trapped holes than a radiation quantum that has undergone shallow absorption. Consequently the electron charge detected by means of the current at anode 26 is affected by the absorption depth of the radiation quantum. Since this signal is indicative of the energy of the radiation quant, it restricts the energy resolution achievable by the solution in FIG. 2.

The shielding electrode 31 embedded in the scintillator element 21 of FIG. 3 acts to improve the energy resolution of the radiation detection device by screening the collecting electrode. With reference to FIG. 3, shielding electrode 31 is a conductive layer that is embedded within scintillator element 21 between anode 26 and cathode 25 and electrically isolated from scintillator element 21. The electrically-isolated conductive layer has a plurality of perforations exemplified by perforation 32 and perforation 33 that are sized and oriented to permit the passage of electrons along a path from the region between the conductive layer and cathode 25 to the region between the conductive layer and anode 26. The perforations preferably have a diameter in the range from 100 micrometers to 5 millimeters, more preferably in the range 500 micrometers to 1 millimeter. Preferably the shielding electrode 31 lies in a plane that is parallel to a plane that includes scintillator element face 24 that is in electrical communication with anode 26; wherein parallel is to be understood to encompass arrangements within +/−10 degrees of exactly parallel.

In use, a bias voltage is applied to shielding electrode 31 in FIG. 3 which acts to screen anode 26 and cathode 25 such that only charge carriers migrating between the collecting electrode and the shielding electrode 31 affect the charge sensed at the collecting electrode. In such a construction anode 26 is preferably used as the collecting electrode because electrons have the highest mobility and are less susceptible to charge trapping than holes, resulting in the highest, fastest response being achieved by measuring the charge collected at anode 26. Preferably shielding electrode 31 is positioned closer to anode 26 than to cathode 25, since in this way the interaction depth for a radiation quantum 27 is increased, and electrons are not sensed by anode 26 until they pass through perforations 32, 33 in shielding electrode 31 and subsequently reach anode 26. In so doing the dependence of the magnitude of the electron charge collected at the anode upon the depth of interaction of the radiation quantum in scintillator element 21 is reduced. Advantageously this improves the energy resolution of radiation detection device 30.

The shielding electrode in FIG. 3 may for example be formed from a conductive grid that is embedded within the amorphous or polycrystalline or ceramic scintillator element during its fabrication. The grid may for example be formed from metal wires or a metal layer having the necessary perforations. The electrical isolation from the scintillator element may be achieved by coating the conductive elements of the conductive grid with a high temperature ceramic insulator that has a higher melting point than that of the scintillator prior to its embedding within the scintillator. Perforations between the conductive elements may be achieved by for example ensuring that the ceramic insulator does not completely fill the holes in the grid. By using, for the conductive grid, a refractory metal with a melting point that exceeds the melting temperature of the scintillator, such as tungsten, the grid may be embedded in the powdered form of the scintillator composition prior to its pressing into the so-called green body. The shielding electrode remains embedded within the scintillator element following firing of the ceramic during which the ceramic, polycrystalline or amorphous structure forms around the shielding electrode.

Figure 4:
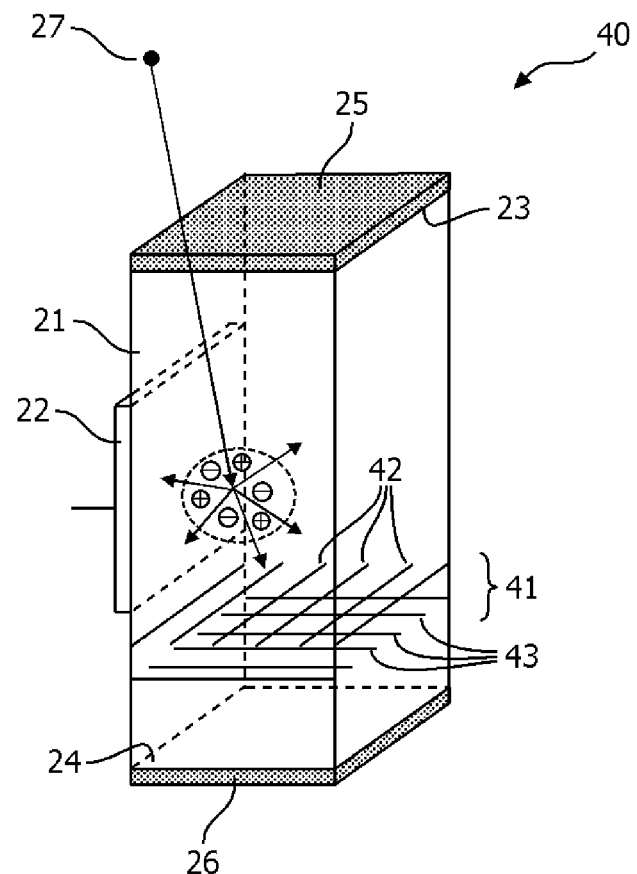
FIG. 4 illustrates an embodiment of a radiation detection device in which a plurality of inductive sensing electrodes are embedded within a scintillator element.

FIG. 4 illustrates an embodiment of a radiation detection device in which a plurality of inductive sensing electrodes are embedded within a scintillator element. As with the embodiment illustrated in FIG. 3, the embedding of inductive sensing electrodes 41 in this way is enabled through the use of a scintillator element 21 having an amorphous, a polycrystalline or a ceramic structure. The inductive sensing electrodes 41 sense the charge carriers in the charge cloud as they are separated by the electric field between anode 26 and cathode 25 and consequently indicate the lateral incidence position of radiation quantum 27. In so doing the lateral position of a received radiation quantum can advantageously be determined more accurately. The term lateral position refers throughout to the position on a plane that is parallel to a face of the scintillator element that receives radiation quanta. The plurality of inductive sensing electrodes 41 includes a first layer of elongate conductors 42 which extend in a first direction from a side face of the scintillator element and are each electrically isolated from the scintillator element by means of an insulating region which surrounds each elongate conductor, and a second layer of elongate conductors 43 which extend in a second direction from another side face of the scintillator element and are each electrically isolated from the scintillator element by means of an insulating region which surrounds each elongate conductor. Furthermore the first layer, the second layer and the scintillator element face 24 having the anode 26 each lie in planes that are mutually parallel, and the first direction and the second direction are mutually transverse. The definition of mutually parallel is to be understood to encompass arrangements within +/−10 degrees of exactly parallel. In use, a bias voltage that is applied between anode 26 and cathode 25 causes the electrons and holes generated by incident radiation quantum 27 to migrate toward anode 26 and cathode 25 respectively. As the charge carriers pass close to inductive sense electrodes 41, mirror charges are induced in the inductive sensing electrodes. The insulating region that surrounds each insulating layer prevents the collection of the charge carriers at the inductive sense electrodes, which instead continue to migrate toward their respective anode or cathode electrode. The configuration in which the two layers of transversely-orientated electrodes are arranged to lie in planes that are parallel to the scintillator element face having the anode, permits the determination of the radiation quantum's lateral position of interaction by means of the two transverse axes of the inductive sensing electrodes at which mirror charges are induced by the charge carriers.

In order to detect the charge induced in inductive sensing electrodes 41 in FIG. 4, each electrode may for example be separately electrically connected to a charge amplifier, a current amplifier or a transimpedance amplifier. The potential of each electrode is preferably maintained at a fixed potential, using for example an operational amplifier configured as a transimpedance amplifier configuration, such that the potentials at each of the two layers within the scintillator element are maintained at a fixed potentials. Preferably the potential of all elongate conductors 42, 43 within a layer are determined in accordance with the potential difference between the cathode and the anode, and the mean distance of that layer between the anode and the cathode such that the potential of each conductor in that layer is the potential at which the scintillator element would have been at that mean distance in the absence of the layer.

The embedding of inductive sensing electrodes 41 in scintillator element 21 in FIG. 4 may be achieved as described in relation to the embedding of shielding electrode 31 in FIG. 3. The electrical isolation of each elongate conductor from the scintillator element may likewise be carried out as described in relation to the electrical isolation of the conductive elements of the conductive grid in FIG. 4.

Figure 5:
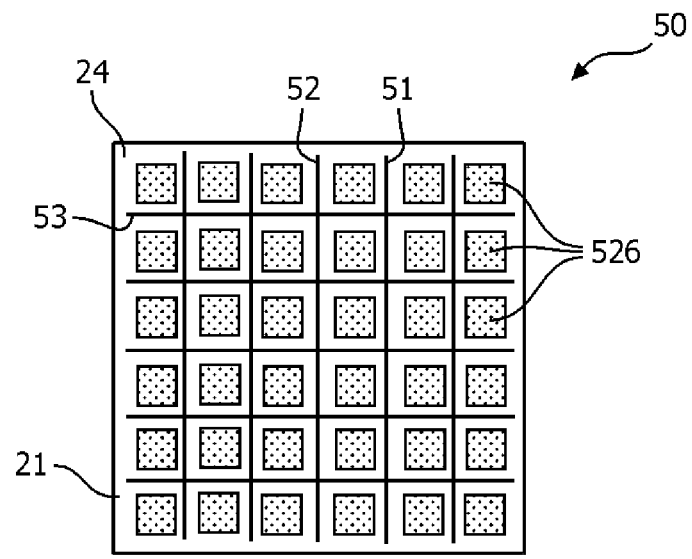
FIG. 5 illustrates an embodiment of a radiation detection device in which a common steering electrode is disposed on the same scintillator element face as a plurality of anodes.

FIG. 5 illustrates an embodiment of a radiation detection device in which a common steering electrode is disposed on the same scintillator element face as a plurality of anodes. For ease of illustration, only face 24 of the scintillator element with the anodes is shown. The improved charge carrier segregation provided by the common steering electrode improves the accuracy of determining the lateral incidence position of a radiation quantum with respect to the scintillator element 21 in the radiation detection device 50. In FIG. 5, common steering electrode 51 is disposed on the same scintillator element face as a plurality of laterally-separated anodes 526 that are in electrical communication with the scintillator element 21. Common steering electrode 51 may be in electrical communication with the scintillator element or alternatively be dielectrically isolated from the scintillator element. Suitable dielectric isolation materials include electrically insulating oxides including a native oxide of the scintillator element itself, and polymers. Common steering electrode 51 includes a plurality of electrically inter-connected conductive regions 52, 53 that are disposed between or around the anodes 526 such that adjacent anodes are laterally separated by at least a portion of the common steering electrode. In use, a bias potential is applied to the common steering electrode, which affects the electric potential within the scintillator element. The resulting electric field lines act to steer charge carriers that are migrating toward the individual laterally-separated anodes 526. In use the bias potential on each anode is positive with respect to the cathode in order to collect electrons at the cathodes. In order to steer electrons towards the anodes the bias potential on the common steering electrode should be less positive, preferably a few volts to a few tens of volts less positive than the potential of the anode at which electrons are collected. Advantageously the improved charge carrier segregation provided by the common steering electrode improves the accuracy of determining the lateral incidence position of a radiation quantum with respect to the scintillator element.

Figure 6:
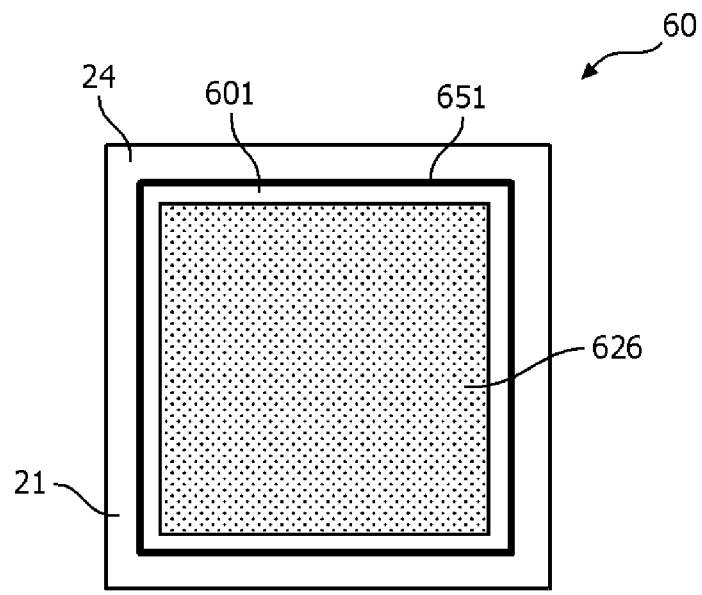
FIG. 6 illustrates an embodiment of a radiation detection device in which a common steering electrode is disposed on the same scintillator element face as a single anode.

FIG. 6 illustrates an embodiment of a radiation detection device in which a common steering electrode is disposed on the same scintillator element face as a single anode. In FIG. 6 common steering electrode 651 surrounds anode 626 such that there is a gap 601 between the anode 626 and common steering electrode 651. Common steering electrode 651 may be in electrical communication with the scintillator element face or alternatively be dielectrically isolated from the scintillator element face. In use, a bias potential is applied to the common steering electrode, which as with the common steering electrode in FIG. 5 acts to steer electrons that are migrating toward the anode, resulting in their collection at the anode. Advantageously the improved charge carrier segregation provided by the common steering electrode improves the accuracy of determining the lateral incidence position of a radiation quantum with respect to the scintillator element.

Figure 7:
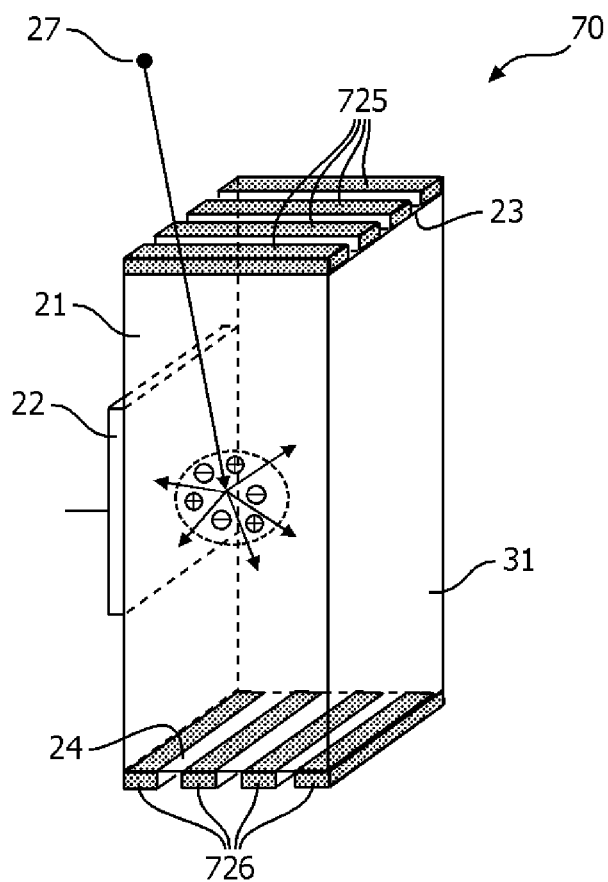
FIG. 7 illustrates an embodiment of a radiation detection device which includes a plurality of laterally-separated anodes and a plurality of laterally-separated cathodes.

FIG. 7 illustrates an embodiment of a radiation detection device which includes a plurality of laterally-separated anodes and a plurality of laterally-separated cathodes. In FIG. 7 a plurality of laterally-separated anodes 726 are in electrical communication with one of the two scintillator element faces 24 and a plurality of laterally-separated cathodes 725 are in electrical communication with the other of the two scintillator element faces 23. The anodes 726 are formed from a plurality of conductive strips extending in a first direction and the cathodes are formed from a plurality of conductive strips extending in a second direction. Furthermore the first direction and the second direction are mutually transverse. In use a bias potential is applied to each anode which is positive with respect to each cathode in order to collect electrons at the anodes and to collect holes at the cathodes. The mutually transverse electrode configuration permits the determination of a radiation quantum's lateral position of interaction with the scintillator element by measuring the charge collected at each of the anodes and each of the cathodes. In a preferred configuration the difference in the magnitude of the charge collected at each anode-cathode pair is computed. By subsequently comparing this difference for all anode-cathode pairs the radiation quantum's lateral position of interaction with the scintillator element may be determined.

Figure 8:
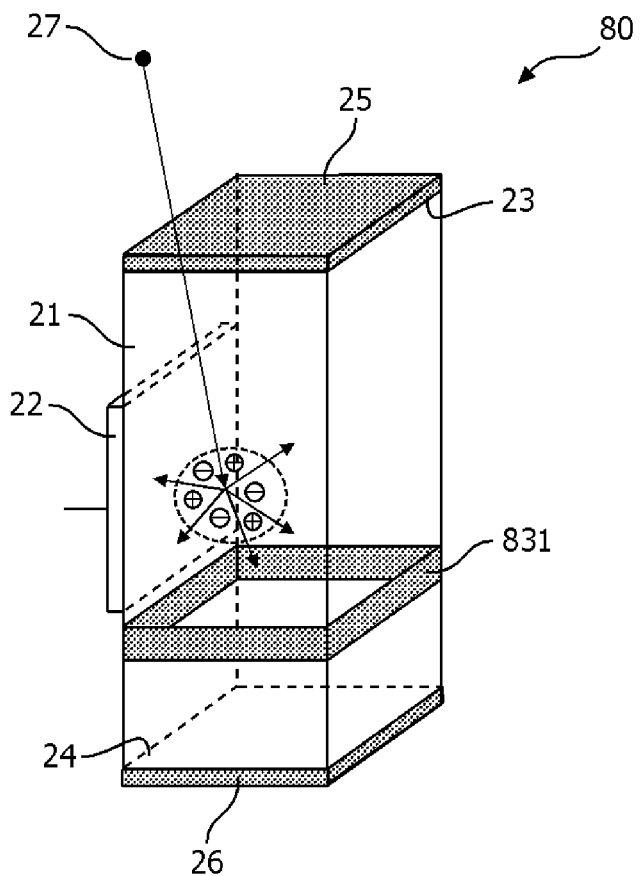
FIG. 8 illustrates an embodiment of a radiation detection device which includes a shielding electrode.

FIG. 8 illustrates an embodiment of a radiation detection device which includes a shielding electrode. In FIG. 8, shielding electrode 831 is a conductive region disposed on a side face of the scintillator element 21 between the cathode 25 and the anode 26 and is dielectrically isolated from the side face of the scintillator element. In a preferred configuration the shielding electrode is formed from a conductive band that surrounds the scintillator element, although such a band having one or more discontinuities is also suitable. Preferably the band lies in a plane that is parallel to, thus within +/−10 degrees of exactly parallel to, a plane that includes the scintillator element face 24 in electrical communication with anode 26. There may be one or more anodes, and one or more cathodes as described in relation to other embodiments. In use, a bias potential is applied to the one or more anodes 26 which is positive with respect to the one or more cathodes 25 in order to separate the charge cloud generated by received radiation quantum 27 into its constituent electrons and holes. Preferably electrons are collected at anode 26 in order to determine the energy of a radiation quantum received by the scintillator element and shielding electrode 831 is positioned closer to anode 26 than to cathode 25. In use, a further bias voltage is applied to the shielding electrode which acts to screen the anode such that only charge carriers migrating between the collecting anode and the shielding electrode are detected by the collecting anode. Preferably the potential on the shielding electrode is determined in accordance with the potential difference between the cathode and the anode, and the mean distance of the shielding electrode between the anode and the cathode such that the potential on the shielding electrode is the potential at which the scintillator element would have been at that mean distance in the absence of the shielding electrode. In another configuration the potential on the shielding electrode is held at ground potential. The shielding electrode further acts to reduce leakage currents between the anode and the cathode via the surface of the scintillator element. Advantageously the shielding electrode acts to improve the energy resolution of the radiation detection device.

In another embodiment of the invention at least one anode or at least one cathode in the radiation detection device is formed from a transparent conductive layer. Furthermore a photodetector is in optical communication with the scintillator element by means of an optical interface that includes at least a portion of the transparent conductive layer. Thus, a photodetector may be positioned in order to detect scintillation light from the scintillator element that has passed through at least a portion of a transparent conductive anode or cathode layer. With reference to FIG. 2, in one contemplated configuration a photodiode similar to photodiode 22 may thus be in optical communication with scintillator element 21 by means of a portion of either or both of anode 26 and cathode 25. In another contemplated configuration a photodiode may be in contact with each and every surface of the scintillator element. Thus with exemplary reference to FIG. 3, each of the six faces of the scintillator element 21 may in principle be in optical communication with a photodetector. By forming an anode or a cathode from a transparent conductor and by so configuring the photodetector, scintillation light generated within the scintillator element that would otherwise have been absorbed at the anode or cathode or attenuated within the scintillation element is instead detected by a photodetector. Consequently the collection efficiency of the scintillation light is improved. In semiconductor scintillator materials having poor scintillation efficiency the ability to detect optical photons at the anode and cathode surfaces represents a significant increase in the timing accuracy of the radiation detection device because the probability of capturing the first optical photon generated by a radiation quantum is improved. Preferably Indium Tin Oxide, ITO, is used as the transparent conductive layer, although other materials including Zinc Oxide, Fluorine doped Tin Oxide, lead zirconium titanate (PZT) thin films, graphene and carbon nanotube networks may also be used. Dielectric isolation of the transparent conductive layer may be provided using for example electrically insulating oxides including a native oxide of the scintillator element itself, and polymers. Such a configuration having a transparent conductive layer may advantageously be used in a PET imaging system to improve image quality through a more accurate determination of coincident events.

The time of detection of each radiation quantum is used in a PET imaging system to distinguish coincident events, or pairs of gamma photons received within a narrow time interval of typically +/−5 ns or each other, from random events. Pairs of coincident events are interpreted as having as common origin a radioactive decay event and thus identify the source of a radiotracer within the imaging region of the PET imaging system. The energy of each gamma photon is used to further validate the common origin of the pair by rejecting gamma photons whose energies lie outside a predetermined energy range and are therefore likely to have been undergone a path alteration through scatter.

To summarize, a radiation detection device for detecting radiation quanta with improved timing accuracy and improved energy resolution has been described with particular reference to a PET imaging system. The radiation detection device finds application in the detection of gamma and x-ray radiation and may further be used in the field of spectral CT. The radiation detection device includes a semiconductor scintillator element and a photodetector. The photodetector is in optical communication with the scintillator element. The scintillator element has two mutually opposing faces; a cathode is in electrical communication with one of the two faces and an anode is in electrical communication with the other of the two faces.

Whilst the invention has been illustrated and described in detail in the drawings and foregoing description, such illustrations and description are to be considered illustrative or exemplary and not restrictive; the invention is not limited to the disclosed embodiments and can be used for timing the detection of gamma and x-ray radiation quanta in various applications.

The invention claimed is:

1. A radiation detection device for detecting gamma or x-ray radiation quanta comprising:
   a semiconductor scintillator element having two mutually opposing faces;
   at least one photodetector that is in optical communication with the scintillator element;
   wherein the at least one photodetector has a photodetector electrical output that is configured to generate a first electrical signal at the photodetector electrical output that is indicative of the time of reception of a detected gamma or x-ray radiation quantum;
   at least one cathode in electrical communication with at least a portion of one of the two scintillator element faces;
   at least one anode in electrical communication with at least a portion of the other of the two scintillator element faces;
   wherein at least one of the at least one cathode or the at least one anode is configured to generate a second electrical signal that is indicative of the energy of the detected gamma or x-ray radiation quantum.

2. The radiation detection device according to claim 1 wherein the second electrical signal is generated subsequently to the first electrical signal.

3. The radiation detection device according to claim 1 wherein the semiconductor scintillator element has an amorphous structure or a polycrystalline structure or a ceramic structure.

4. The radiation detection device according to claim 3 further comprising a shielding electrode;
   wherein the shielding electrode is a conductive planar layer embedded within the scintillator element between the anode and the cathode and electrically isolated from the scintillator element; and
   wherein the electrically-isolated conductive layer has a plurality of perforations that are configured to permit the passage of electrons along a path from the region between the conductive layer and the cathode to the region between the conductive layer and the anode.

5. The radiation detecting device according to claim 3, wherein the semiconductor scintillator element is formed at an elevated temperature and further including:

an electrode embedded within the scintillator element, the electrode being constructed of a refractory metal with a melting point that exceeds a melting temperature of the semiconductor scintillator element and being coated with an oxide insulator with a melting point higher than the melting point of the semiconductor scintillator element.

6. The radiation detection device according to claim 1 in which the at least one anode is a plurality of laterally-separated anodes.

7. The radiation detection device according to claim 6 further comprising a common steering electrode disposed on the same scintillator element face as the plurality of anodes;
wherein the common steering electrode includes a plurality of electrically inter-connected conductive regions that are disposed between or around the anodes such that adjacent anodes are laterally separated by at least a portion of the common steering electrode.

8. The radiation detection device according to claim 1 having a single anode and further comprising a common steering electrode disposed on the same scintillator element face as the anode;
wherein the common steering electrode surrounds the anode such that there is a gap between the anode and the common steering electrode.

9. The radiation detection device according to claim 1 in which the at least one anode is a plurality of laterally-separated anodes and in which the at least one cathode is a plurality of laterally-separated cathodes;
wherein the anodes are formed from a plurality of conductive strips extending in a first direction and the cathodes are formed from a plurality of conductive strips extending in a second direction;
wherein the first direction and the second direction are mutually transverse.

10. The radiation detection device according to claim 1 wherein the semiconductor scintillator element includes a plurality of side faces disposed between the two mutually opposing faces, and further including:
a shielding electrode having a conductive ring that is disposed around the side faces of the scintillator element and dielectrically isolated from the side faces of the semiconductor scintillator element, wherein the conductive ring is biased to allow electrons to pass the anode and inhibiting holes from passing to the anode.

11. The radiation detection device according to claim 1 in which the at least one anode is a plurality of laterally-separated anodes; the device further comprising:
electronic circuitry configured for each anode to convert electrical charge collected at that anode into an electrical current or voltage signal;
electronic circuitry or a processor configured to receive the electrical current or voltage signals and to compute the lateral position of interaction of a radiation quantum received by the scintillator element based on the relative magnitudes of the electrical current or voltage signals.

12. The radiation detection device according to claim 1 further comprising:
electronic circuitry configured for each anode to convert electrical charge collected at that anode into an electrical current or voltage signal;
electronic circuitry or a processor configured to receive the one or more electrical current or voltage signals and to compute the energy of a gamma or x-ray radiation quantum received by the scintillator element by summing the magnitudes of the one or more electrical current or voltage signals to generate a summed signal indicative of the total charge collected at the one or more anodes.

13. The radiation detection device according to claim 1 further comprising:
first timing circuitry configured to receive electrical signals generated by each of the at least one photodetector in response to the reception of a gamma or x-ray radiation quantum and to generate a first timestamp indicative of the earliest time at which an electrical signal generated by any of the at least one photodetector exceeds a first predetermined threshold;
electronic circuitry configured for each anode to convert electrical charge collected at that anode into an electrical current or voltage signal;
second timing circuitry configured to receive the electrical current or voltage signals generated from electrical charge collected by each anode in response to the reception of the gamma or x-ray radiation quantum and to generate a second timestamp indicative of the time at which at least one of the electrical current or voltage signals exceed a second predetermined threshold;
electronic circuitry or a processor configured to compute a depth of interaction of the radiation quantum in the scintillator element based on the time difference between the first timestamp and the second timestamp.

14. A PET or x-ray imaging system comprising the radiation detection device of claim 1.

15. The radiation detector device according to claim 1, further including:
an electrode embedded in the semiconductor scintillator element between the anode and the cathode, the electrode including:
one or more electrical conductors which define a plurality of perforations; and
an electrically insulating coating configured to electrically isolate the one or more electrical conductors from the semiconductor scintillator element,
wherein the perforations defined by the one or more electrical conductors coated by the electrically insulating coating are configured to pass electrons therethrough.

16. A radiation detection device for detecting gamma or x-ray radiation quanta comprising:
a semiconductor scintillator element having two mutually opposing faces, a first side face, and a second side face, wherein the first side face and the second side face are disposed between the two mutually opposing faces;
at least one photodetector that is in optical communication with the scintillator element;
wherein the at least one photodetector has a photodetector electrical output that is configured to generate a first electrical signal at the photodetector electrical output that is indicative of the time of reception of a detected gamma or x-ray radiation quantum;
at least one cathode in electrical communication with at least a portion of one of the two scintillator element faces;
at least one anode in electrical communication with at least a portion of the other of the two scintillator element faces;
wherein at least one of the at least one cathode or the at least one anode is configured to generate a second electrical signal that is indicative of the energy of the detected gamma or x-ray radiation quantum; and a plurality of inductive sensing electrodes embedded within the scintillator element in the region between the at least one anode and the at least one cathode;

wherein the plurality of inductive sensing electrodes includes a first layer of elongate conductors which extend in a first direction from the first side face of the scintillator element and are each electrically isolated from the scintillator element by means of an insulating region which surrounds each elongate conductor, and a second layer of elongate conductors which extend in a second direction from the second side face of the scintillator element and are each electrically isolated from the scintillator element by means of an insulating region which surrounds each elongate conductor;

wherein the first layer, the second layer and the scintillator element face having the anode each lie in planes that are mutually parallel, and wherein the first direction and the second direction are mutually transverse.

17. A radiation detection device for detecting gamma or x-ray radiation quanta comprising:

a semiconductor scintillator element having two mutually opposing faces;

at least one photodetector that is in optical communication with the scintillator element;

wherein the at least one photodetector is configured to generate a first electrical signal indicative of a time of reception of a detected gamma or x-ray radiation quantum;

at least one cathode in electrical communication with at least a portion of one of the two scintillator element faces;

at least one anode in electrical communication with at least a portion of the other of the two scintillator element faces;

wherein at least one of the at least one cathode or the at least one anode is configured to generate a second electrical signal that is indicative of an energy of the detected gamma or x-ray radiation quantum;

wherein at least one anode or at least one cathode is formed from a transparent conductive layer; and wherein the at least one photodetector is in optical communication with the scintillator element by means of an optical interface that includes at least a portion of the transparent conductive layer.

* * * * *